No. 835,019. PATENTED NOV. 6, 1906.
E. FREUND.
BRAKE FOR VEHICLES.
APPLICATION FILED MAR. 14, 1905.

2 SHEETS—SHEET 1.

Witnesses

Inventor
E. Freund
By his Attorneys
Baldwin Wright

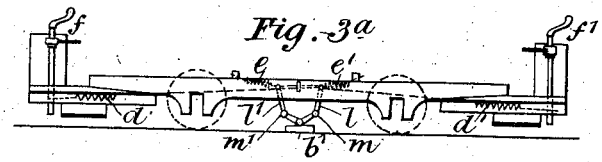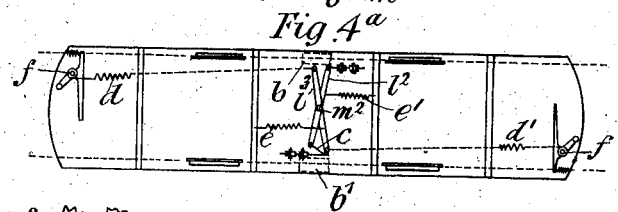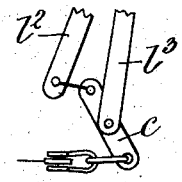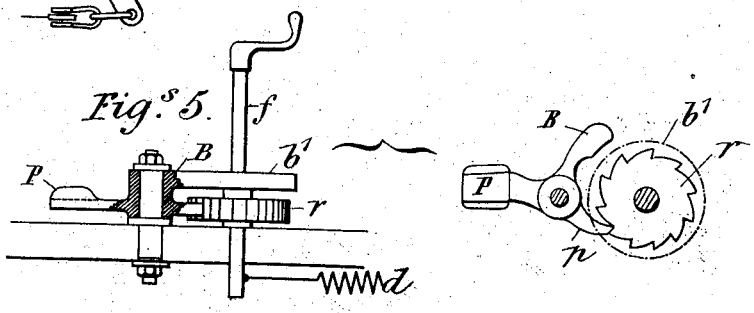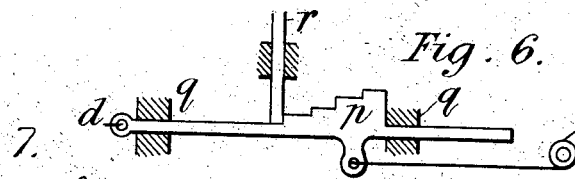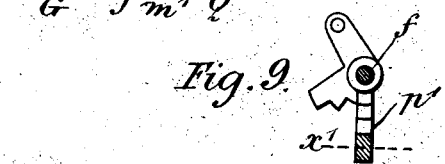

UNITED STATES PATENT OFFICE.

EDWIN FREUND, OF WESTMINSTER, ENGLAND.

BRAKE FOR VEHICLES.

No. 835,019.        Specification of Letters Patent.        Patented Nov. 6, 1906.

Application filed March 14, 1905. Serial No. 250,016.

*To all whom it may concern:*

Be it known that I, EDWIN FREUND, a subject of the Emperor of Austria-Hungary, residing at 39 Victoria street, in the city of Westminster, England, have invented certain new and useful Improvements in Brakes for Vehicles, of which the following is a specification.

It has before been proposed to apply brakes by means of springs; but such springs have been found to act too suddenly for many purposes. To overcome this defect, I use two (or more) springs in such a way that they either increase or decrease the effect of the spring (or group of springs) that comes first into positive action when the brake is applied. As such brakes are of special use for vehicles, I shall explain how this improvement can be applied to tram-cars.

Figure 1:
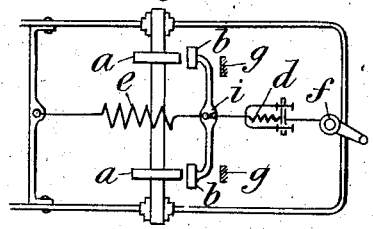
Figure 2:
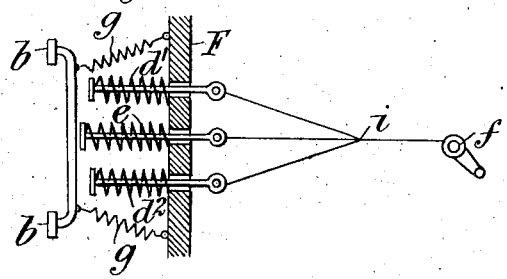
Figure 3:
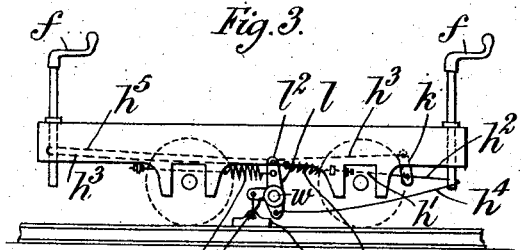
Figure 4:
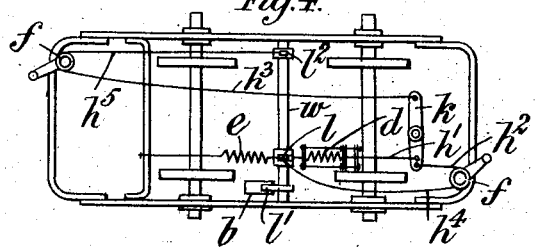

Figure 1 is a diagrammatic plan of the under carriage of a tram-car fitted with brakes in accordance with this invention. Fig. 2 is a similar view of a modification. Figs. 3 and 4 are a diagrammatic elevation and plan showing the application of the invention to a track-brake, and Figs. $3^a$ and $4^a$ are similar views of a modification. Fig. 5 is a sectional elevation and plan showing the mechanism for releasing and regulating the brakes. Fig. 6, 8, and 9 show modifications. Fig. 7 shows a detail to a larger scale.

In Fig. 1 $a$ $a$ are two wheels on a common axle. $b$ $b$ are the brake-shoes. $e$ is a spring fastened at one end to the frame of the car and at the other to the bar $i$, which connects the brake-blocks $b$. $f$ is the apparatus by means of which the brakes are released or applied and which I shall, for shortness sake, call the "controller." $d$ is a spring inserted in the rod or chain that connects the controller $f$ with the brake-bar. One of the simplest forms of the controller $f$ would be an ordinary brake-winding spindle with a cranked handle. When this spindle is free, the spring $e$ applies the brakes with full force. If the spindle $f$ is wound clockwise, the slack of the chain between the controller $f$ and the beam $i$ will first be taken up, and then the spring $d$ will be stretched without pulling the brake-shoes off the wheels until the tension of the spring $d$ exceeds that of the spring $e$. It will be seen that all the time during which the controller $f$ is wound the tension produced in the spring $d$ counterbalances part of the tension of the spring $e$. The brake-pressure is therefore gradually reduced up to the moment when the tension of the spring $d$ equals the tension of the spring $e$.

It will also be seen that if the controller $f$ were directly connected with the beam $i$ by means of a chain the brakes would be pulled off the wheels immediately after the slack of the chain had been taken up by winding, because as soon as the chain pulled the beam $i$ the shoes $b$ would necessarily be moved toward the controller $f$, so that they would be moved out of contact with the wheels at the moment the winding took any effect at all upon them. If, however, the spring $d$ is inserted, the beam $i$ does not move before the tension of the spring $d$ has been raised to make it equal to that of the spring $e$—viz., before the brake-pressure has gradually been reduced to zero.

Fig. 2 shows a similar arrangement; but the additional springs $d'$ $d^2$ are provided to increase the effect of the brake-spring $e$. The bar F is a fixture on the car. $g$ $g$ are springs which pull the brake-blocks off the wheels as soon as the spring $e$ is sufficiently pulled back. The action of the spring $e$ can of course be further regulated as before by inserting a spring between the controller $f$ and the beam $i$.

Figs. 3 and 4 show the invention applied to slipper-brakes. $b$ is a slipper-block connected to a lever $l'$, which is mounted on the horizontal shaft $w$. On this shaft is also fixed a double lever $l$, to the upper part of which are connected the springs $d$ and $e$. The other end of the spring $e$ is connected by means of a chain $h'$ $h^2$ or similar device to the spindle $f$ on the right of the car. The spring $d$ can also be stretched by turning the winding-spindle $f$ at the left-hand end of the car by means of the chain $h^3$ and double lever $k$. The action of this arrangement will be readily understood from what has been said with regard to Fig. 1.

In order to guard against failure of the brake in case the springs $e$ $d$ or other parts fail, I provide safety-chains $h^4$ and $h^5$, which are usually slack, but are tightened when the spindles $f$ are turned anticlockwise beyond the position required by the springs $e$ and $d$ to fully apply the brakes. The chain $h^5$ is connected to an arm $l^2$, fixed to the shaft $w$. It will be seen that when the safety-chain $h^4$ or $h^5$ is tightened the brake-block $b$ is pressed down onto the rail.

The winding of the spindle $f$ referred to in connection with Figs. 1 to 4 may be arranged as shown in Fig. 5, where $r$ is the usual ratchet-wheel, and $p$ the pawl. P is a foot-lever by which the pawl $p$ is turned and put out of gear. On the spindle $f$ is also mounted a brake-wheel $b'$, upon which acts the brake-block B, which can also be applied by the foot-lever P. If the spring $d$ is being wound hard for releasing the brake, the pawl $p$ is made to engage with the ratchet-wheel $r$, and the spindle $f$ is thus prevented from turning anticlockwise. As soon as the pawl $p$ releases the ratchet-wheel $r$ the spindle $f$ will turn anticlockwise. It can be stopped at any moment by applying the brake-block B on the brake-pulley $b'$, and while holding the handle $h$ with his hand the driver can make the pawl $p$ reëngage with the ratchet-wheel $r$. Should the brake-pressure be thought insufficient, this action may be repeated. If, on the other hand, the brake-pressure is thought to be too great, the handle $f$ is turned clockwise.

In Figs. 3$^a$ and 4$^a$ the two brake-blocks $b$ and $b'$ are carried by two levers $l$ and $l'$, with fulcrums at $m$ and $m'$. The other end of the lever $l$ is linked to a lever $l^2$, whose fulcrum is at $m^2$. The other end of the lever $l^2$ is linked to one end of the compensating member $c$, the other end of which is connected to the lever $l'$. An intermediate point of this compensating member is pivoted to a lever $l^3$, having the same fulcrum, $m^2$, as the lever $l^2$. The two ends of the lever $l^3$ are connected by tensional members to the braking devices $f$ and $f'$. Into these tensional connections springs $d$ and $d'$ are interposed, while the springs $e$ and $e'$ tend to turn the lever $l^3$ clockwise and so as to apply the brakes.

While the device indicated in Fig. 5 enables a perfect adjustment of the brake-pressure from low pressure to full pressure, the device illustrated in Fig. 6 is able to provide four different brake-pressures.

$p$ is a bolt with steps housed in the guides $q$, which permit of its being moved toward the spring $d$ and back again. Another bolt $r$ engages with the steps of the bolt $p$. In the position shown the spring $d$ is fully stretched and the brakes would be released. If the bolt $r$ is withdrawn the depth of the first step of the bolt $p$ and the spindle $f$ is allowed to turn clockwise, the bolt $p$ will be pulled the length of the first step toward the spring $d$, and the brakes would be applied with a small pressure. Pulling the bolt $r$ back the depth of another tooth will allow the bolt $p$ to move once more toward the spring $d$ and will produce the next higher brake-pressure obtainable, and so on.

In Fig. 7 an arrangement is shown for regulating the range of the springs. One end of the spring $f$ is attached at R to a fork G. The other end of this spring is attached to a cross-bar Q. On the fork G stops $m'$ and $m^2$ are arranged, which determine the distance through which the cross-bar Q can be moved on the fork. The simplest way of arranging these stops is by cutting threads on the ends of the fork and using nuts for stops.

Figs. 8 and 9 represent similar step-release devices to those shown in Fig. 6. In Fig. 8 $p$ is a ratchet-wheel or disk fixed on the brake-spindle $f$ of Fig. 1. In the position shown the spring $d$ is fully stretched, and by withdrawing the bolt $r$ the height of one tooth of the ratchet $p$ the first degree of brake-pressure is obtained, and so on. In Fig. 9 a similar arrangement is shown, with the exception that the bolt $r$ is replaced by a second ratchet-wheel $p'$, which can be turned on the axis $x'$ for the purpose of allowing the spindle $f$ to turn anticlockwise.

It should be understood that I do not restrict myself to any of the mechanical details indicated in the diagrams given, and that springs $e$ or springs $d$ may be in multiple, and that instead of spiral or tensional springs any other kind of spring may be used, and that the connection between the springs, brake-blocks, and controller may be made by means of ropes, chains, draw-bars, connecting-rods, levers, or any other mechanical element that serves the purpose indicated, and that suitable means should be provided for adjustment of dimensions and position.

It should also be understood that means may be provided for graduating the tension of the spring $e$, Fig. 1, at $g$; also, that the winding-spindle $f$ may be replaced by a lever, a sector-lever, a screw-spindle, or any other mechanical appliance suitable for altering the tension of the spring $d$. Instead of tightening or releasing the spring $d$ by hand this might be done by mechanical or electrical power.

What I claim is—

1. The combination of a brake, a spring tending to apply the brake, a controller acting against the spring to release the brake and a second spring interposed between the brake and the controller for regulating the power of the latter, the arrangement being such that both springs are being released when the brakes are being applied.

2. The combination of a brake, a spring one end of which acts on the brake while the other end is connected to a fixed point, such spring always tending to apply the brake, a controller holding the spring out of action and a second spring acting on the controller and tending to make it release the first spring, the arrangement being such that both springs are being released when the brakes are being applied.

3. The combination of a brake, a spring tending to apply the brake, a spring tending to release the brake a chain connected to the latter spring, and means for holding the chain in any position, the arrangement being such that both springs are being released when the brakes are being applied.

4. The combination of a brake, a spring tending to apply the brake, a spring tending to release the brake, a chain connected to the latter spring, a barrel on which the chain is wound, and a subsidiary brake acting on the barrel.

5. The combination of a brake, a spring tending to apply the brake, a spring tending to release the brake, a chain connected to the latter spring, a barrel on which the chain is wound, a subsidiary brake acting on the barrel, a ratchet-wheel carried by the barrel, a second ratchet-wheel engaging with the first and carried by the drum, and means for revolving the drum.

6. The combination of a brake, a spring tending to apply the brake, a spring tending to release the brake, a chain connected to the latter spring, a barrel on which the chain is wound, a subsidiary brake acting on the barrel, a ratchet-wheel carried by the barrel, a second ratchet-wheel engaging with the first and carried by the drum, a spindle fixed to the drum, a handle on the spindle, and a second handle operating the subsidiary brake.

7. The combination of a brake, a spring connected to the brake, a device controlling the brake, a second spring interposed between the controlling device and the brake, a subsidiary brake acting on the controlling device and a second controlling device acting on the subsidiary brake.

8. The combination of a brake, a spring connected to the brake, a device controlling the brake, a second spring interposed between the controlling device and the brake, and step-by-step mechanism holding the controlling device, the arrangement being such that both springs are being released when the brakes are being applied.

9. The combination of a brake, a spring connected to the brake, a device controlling the brake, a second spring interposed between the controlling device and the brake, a subsidiary brake acting on the controlling device, and step-by-step mechanism holding the controlling device.

10. The combination of a brake, a spring connected to the brake, a device controlling the brake, a second spring interposed between the controlling device and the brake, and an auxiliary connection between the controlling device and the brake whereby the brake can be operated as an ordinary brake.

11. The combination of a brake, a spring connected to the brake, a device controlling the brake, a second spring interposed between the controlling device and the brake, a subsidiary brake acting on the controlling device, and an auxiliary connection between the controlling device and the brake whereby the brake can be operated as an ordinary brake.

12. The combination of a brake, a spring connected to the brake, a device controlling the brake, a second spring interposed between the controlling device and the brake, step-by-step mechanism holding the controlling device, and an auxiliary connection between the controlling device and the brake whereby the brake can be operated as an ordinary brake.

13. The combination of a brake, a spring connected to the brake, a device controlling the brake, a second spring interposed between the controlling device and the brake, a subsidiary brake acting on the controlling device, step-by-step mechanism holding it, and an auxiliary connection between the controlling device and the brake whereby the brake can be operated as an ordinary brake.

EDWIN FREUND.

Witnesses:
H. D. JAMESON,
A. NUTTING.